M. ZAWISTOWSKI.
CLOTH CUTTING MACHINE.
APPLICATION FILED DEC. 5, 1918.

1,319,707.

Patented Oct. 28, 1919.
2 SHEETS—SHEET 1.

INVENTOR
Martin Zawistowski
BY C. W. Fairbanks
ATTORNEY

M. ZAWISTOWSKI.
CLOTH CUTTING MACHINE.
APPLICATION FILED DEC. 5, 1918.
1,319,707.
Patented Oct. 28, 1919.
2 SHEETS—SHEET 2.
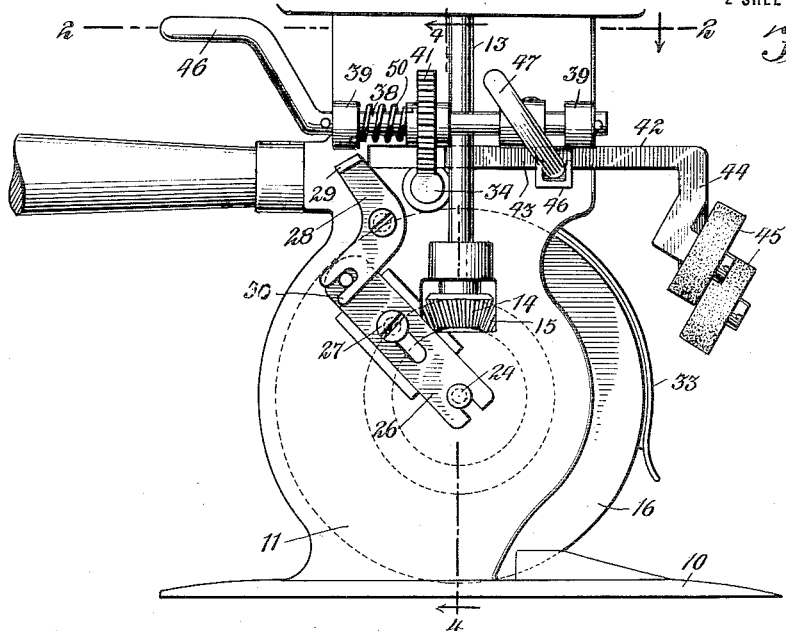
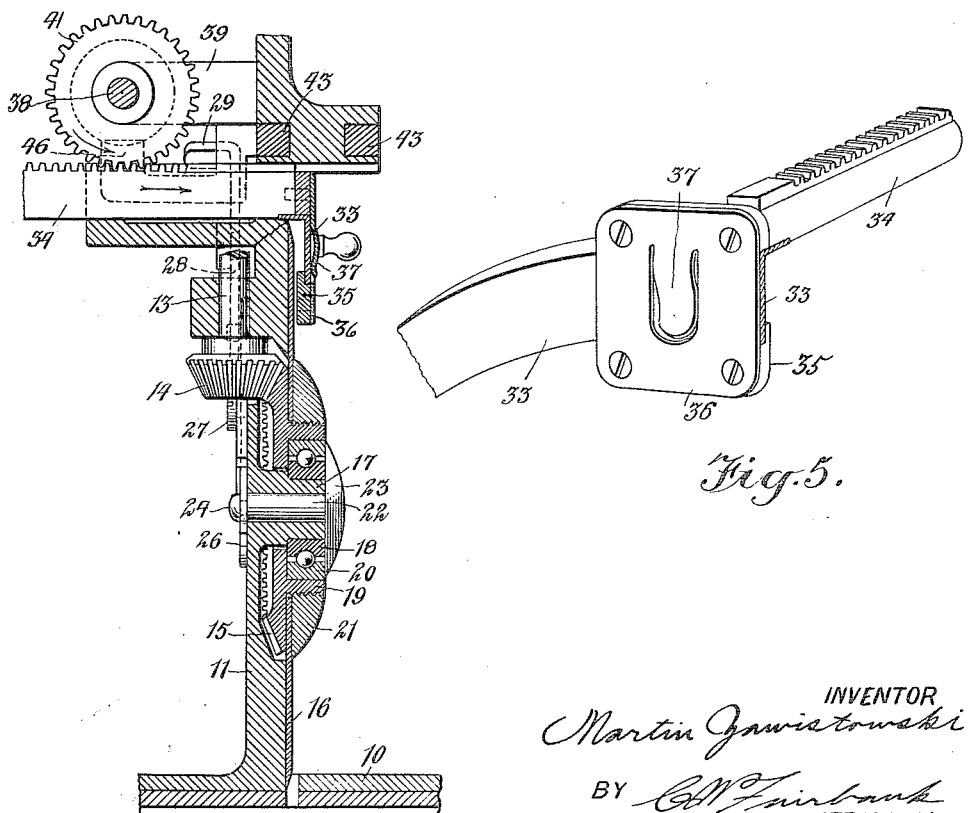
INVENTOR
Martin Zawistowski
BY C. W. Fairbanks
ATTORNEY

UNITED STATES PATENT OFFICE.

MARTIN ZAWISTOWSKI, OF BROOKLYN, NEW YORK.

CLOTH-CUTTING MACHINE.

1,319,707. Specification of Letters Patent. Patented Oct. 28, 1919.

Application filed December 5, 1918. Serial No. 265,819.

*To all whom it may concern:*

Be it known that I, MARTIN ZAWISTOWSKI, a citizen of the United States, and a resident of Brooklyn, in the county of Kings and State of New York, have invented certain new and useful Improvements in Cloth-Cutting Machines, of which the following is a specification.

This invention relates to cloth cutting machines of the portable rotary knife type and involves novel, simple, and easily operable mechanism for supporting and moving the knife guard and grinder into and out of operative position. In certain common forms of cloth cutting machines, the rotary knife is journaled on a standard carried by a base which latter is adapted to slide or move along the supporting surface and beneath the cloth to be cut. The standard also carries a small electric motor for rotating the knife at high speed and the portion of the cutting edge of the knife directly above the cloth is protected by an adjustable guard which may be moved out of operative position when it is desired to sharpen the knife by a rotatable grinder, also carried by the standard. Various means have been provided for supporting the guard and grinder and coördinating their movements so that the guard is automatically moved out of position as the grinder is brought toward the cutting edge. Ordinarily the guard and the grinder are pivotally connected to the standard. This necessitates the movement of each through a comparatively wide range and to considerable distances from the cutting edge when out of operative position. Thus the parts when not in operation constitute objectionable projections from the machine and often cause trouble by getting in the way of the operator. In my improved construction these parts are mounted to slide rather than swing about pivots so that the guard in moving away from the knife may travel in the direction of the axis of the latter to only a very short distance and the grinder may slide directly toward the knife through a very short distance as the guard slides to one side. Thus none of the parts at any time project from the machine to only a very slight extent and a comparatively small movement is necessary to bring them into and out of operative position. Furthermore, there is greater rigidity of the parts and less lost motion resulting from wear.

As a further important feature of my invention, I provide means whereby the knife may be removed or replaced without the use of tools and very quickly and easily.

In the accompanying drawings I have illustrated one embodiment of my invention, although it will of course be understood that various other forms may be readily designed within the scope of my invention as defined in the appended claims. The form illustrated is, therefore, not to be considered in a limiting sense.

In these drawings:

Fig. 3 is a side elevation showing the opposite side to that shown in Fig. 1.

Fig. 4 is a section on the line 4—4 of Fig. 1.

Fig. 5 is a perspective view of the guard and its operating rack bar.

Figure 1:
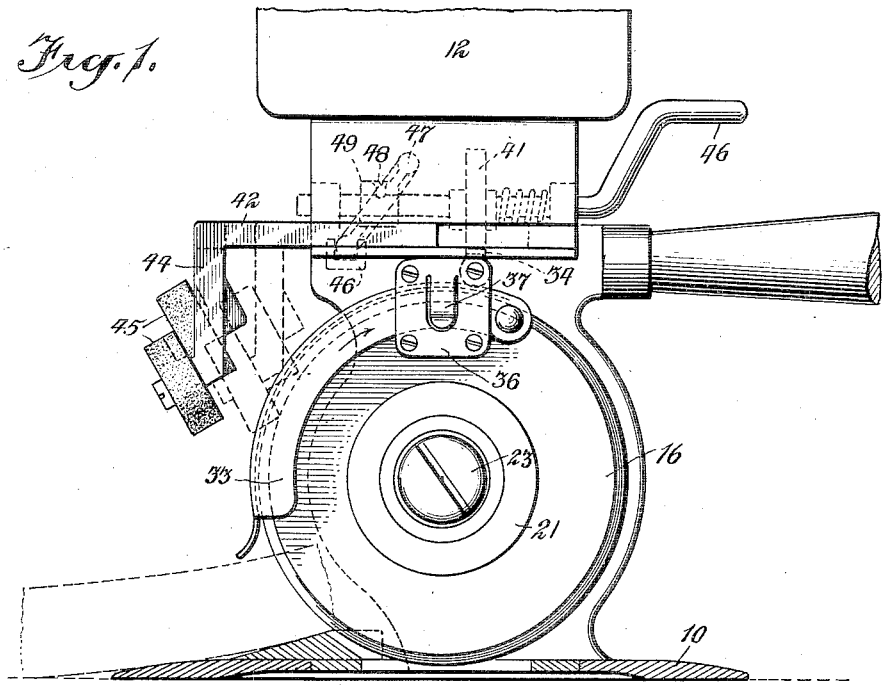
Figure 1 is a side elevation, certain of the parts being shown in section, and the motor being broken away.
Figure 2:
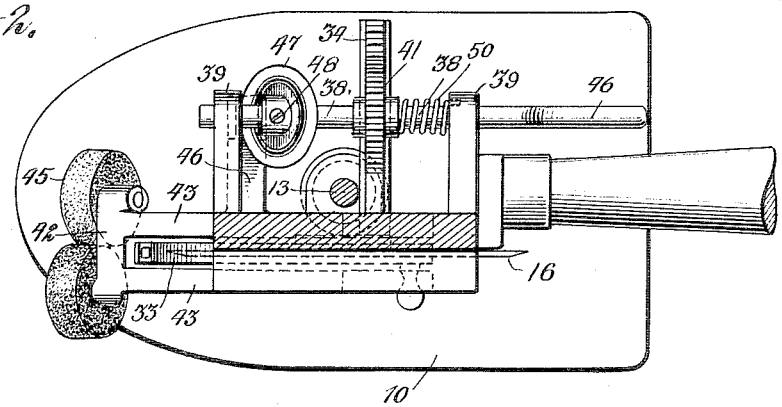
Fig. 2 is a top plan view, the motor support being broken away on line 2—2 of Fig. 3.

I have illustrated my invention in connection with a machine having the usual base 10 formed integral with a standard 11. Mounted on the upper end of this standard is the electric motor 12, the drive shaft 13 of which has a bevel pinion 14 meshing with a bevel gear 15 connected to the knife 16.

For mounting the knife and facilitating its ready removal, the standard 11 has a boss or collar 17 upon the exterior of which is mounted one race ring 18 of a ball bearing. The gear wheel 15 encircles the boss and has an outwardly extending annular flange 19 to the interior of which is secured the other race ring 20 of the ball bearing. The knife 16 has a central opening receiving the flange 19 and the latter is exteriorly threaded to receive a clamping collar 21 which holds the knife rigid with the gear-wheel 15. The outer race ring 20 of the ball bearing is fixed to the collar 19 while the inner race ring is keyed so that it may slide on or off the boss 17 but be held against rotation in respect to the latter. A clamping bolt 21 extends through the boss 17 and has a head 23 preferably of such size as to entirely cover the ball bearing and prevent dust or dirt from gaining access to the latter. The opposite end of the bolt has an annular groove 24 flush with a guideway or groove 25 in the side of the standard opposite to the boss 17. Within this guideway is a locking plate 26 with a slot in its end adapted to receive the clamping bolt 22 and hold the latter against endwise movement. This locking plate or slide 26 has a limited endwise movement for bringing it into or out of operative relationship to the clamping bolt 22. Any suitable means may be provided for holding this slide against movement or for manually moving it when desired. I have illustrated a set screw 27 which extends through a slot in the slide and may be tightened to clamp the latter against movement and I have also shown a bell crank lever 28 pivoted on the standard and having an upper thumb-piece 29 and pronged lower end 30 engaging a pin on the slide. By pressing the upper end of the bell crank lever away from the main handle of the machine, the slide may be raised and the locking bolt 22 released so that the knife, its gear 15, and its ball bearing may be removed from the machine.

For guarding and protecting the portion of the cutting edge above the cloth, I provide a guard 33 which may be substantially L-shaped in cross section and be curved to follow the curvature of the edge. This guard is carried by a slide 34 mounted in the standard above the knife and movable in a direction parallel to the axis of the knife. The body of the slide is in the form of a rack bar while the head 35 thereof has a recess or transverse passage receiving the guard. To facilitate the circumferential adjustment of the guard when it is desired to cut superposed layers of cloth of greater or less distance, friction holding means are provided. As shown, the head 35 has a cover plate 36 in which there is formed a spring tongue 37 normally applying pressure to the outer side of the guard. This pressure is sufficient to normally hold the guard and slide rigid in respect to each other but permits the guard to be moved through the head 35 of the slide when desired. Upon moving the slide 34 in the direction of its length, the guard will be carried in the direction of the axis of the knife and into or out of operative position in respect to the cutting edge of the latter. For effecting this movement of the slide I provide a shaft 38 mounted in bearings 39 on the standard and having a crank handle 40 adjacent to the main handle of the machine. This shaft has a pinion 41 meshing with the rack bar 34 so that upon a rotation of the shaft the guard may be brought into or out of position.

The upper part of the standard also has a second slide 42 above the knife and movable in a direction parallel to the plane of the knife. This slide is shown as including two bar sections 43 movable in grooves at opposite sides of the standard and at the front end of the slide is a depending bracket 44 upon which are mounted the grinder wheels 45. I do not wish to be limited to any particular character of grinders or any particular relative positioning of the two wheels, although it is important that the wheels be so positioned that they engage with opposite sides of the cutting edge and at such an angle that the rotation of the knife tends to rotate the grinder disks with an abrasive rather than a true rolling contact. The slide 43 has a laterally extending arm 46 terminating adjacent to the shaft 38 and on the latter is provided an inclined cam 47 engaging in a groove in the arm 46 as shown particularly in Fig. 1. The cam is normally in such position that the grinders are spaced away from the cutting edge, as shown particularly in Fig. 1, and the inclination of the cam in respect to the axis of the shaft is such that a rotation of the shaft through approximately one half a revolution will draw the slide 42 back to bring the grinders into engagement with the knife edge as indicated in dotted lines in Fig. 1. The cam may be adjusted lengthwise or circumferentially of the shaft and held in the adjusted position by any suitable means, as for instance, a set screw 48 in a collar 49 integral with the cam. As both the cam 47 and the pinion 41 are connected to the same shaft it will be noted that as the shaft rotates the guard will be moved in the direction of the axis of the knife while the grinders move in the plane of the knife and the parts are so proportioned that as the guard clears the knife, the grinders come into operation. Thus the parts move to only a comparatively slight extent and at no time do they project to any great distances in the body of the machine.

As the normal position of the parts is with the guard in position and the grinder away from the knife, I may and preferably do provide means for normally retaining the parts in this position. For such a purpose I have shown a torsion spring 50 on the shaft 38 normally tending to rotate the shaft clockwise from the position shown in Fig. 4 or rather to return it to the position shown in said figure after the manual rotation of the shaft in the opposite direction to bring the guard out and the grinders back.

Having thus described my invention what I claim as new and desire to secure by Letters Patent is:

1. A cloth cutting machine having a knife, a support therefor, a rack bar slidably mounted in said support and extending in a direction substantially parallel to the axis of the knife operating means including a pinion meshing with said rack bar for sliding the latter, and a knife guard carried by said rack bar.

2. A cloth cutting machine having a circular knife, a support therefor, a rack bar slidably mounted in said support and extending in a direction substantially parallel to the axis of the knife, operating means including a pinion meshing with said rack bar for sliding the latter, a knife-guard carried by said rack bar, and adjustable circumferentially of the knife and in respect to said rack bar.

3. The combination with a circular knife of a rack bar extending substantially parallel to the axis of the knife, and having a spring tongue at one end thereof, a curved knife guard carried by said rack bar and held friction tight in respect thereto by said spring tongue but adjustable circumferentially of the knife in respect to said rack bar, a shaft substantially parallel to the plane of the knife, and a pinion on said shaft meshing with said rack bar.

4. The combination with a circular knife of a shaft disposed substantially parallel to the plane of the knife, a knife guard bodily slidable in a direction at an angle to the plane of the knife, a grinder bodily slidable substantially in the plane of the knife, and operative connections between said shaft and said guard and said grinder for moving the guard and grinder into and out of operative position upon the rotation of the shaft.

5. The combination with a circular knife of a shaft substantially parallel to the plane of the knife and having a cam and a pinion thereon, a knife guard having a member operatively engaging with said pinion, and a grinder having a member operatively engaging with said cam.

6. The combination with a circular knife of a shaft extending substantially parallel to the plane of the knife and having a cam and a pinion thereon, a knife guard slidable in a direction at right angles to the plane of the knife, a rack bar connecting said pinion and said guard, a grinder movable substantially in the plane of the knife, and a slide connecting said grinder and said cam.

7. A cloth cutting machine having a circular knife, a standard upon which said knife is journaled and provided with a pair of guideways, one extending transversely to the plane of the knife and one parallel to the plane of the knife, a pair of slides mounted in said guideways, means for simultaneously operating said slides, a grinder movable into or out of operative position in respect to the knife by the movement of one of said slides, a knife guard movable into or out of operative position by the movement of the other slide, and means for operating said slides simultaneously.

8. The combination of a standard for cloth cutting machines having a pair of guideways, slides movable in said guideways, a grinder carried by one slide, a knife guard carried by the other slide, and means for simultaneously operating said slides to move said knife guard out of operative position and said grinder into operative position in respect to said knife.

9. In a cloth cutting machine, the combination of a standard having a hollow boss, a bevel gear wheel encircling said boss and having an outwardly extending annular flange on the side thereof opposite to the gear teeth, a ball bearing within said flange and connecting the latter to said boss, a knife encircling said flange and secured to said gear wheel, a locking bolt extending through said boss, and having a cover plate at one end for said ball bearing and means engaging with the opposite end for normally preventing the withdrawal of the bolt.

10. A cloth cutting machine having a knife, a support therefor, a bar mounted in said support and movable in a direction transverse to the plane of the knife, a knife guard carrier rigidly secured to said bar, a knife guard secured to said carrier and adjustable thereon circumferentially of said knife, and a rotatable shaft having operative connection to said bar for moving the latter endwise.

Signed at New York city, in the county of New York and State of New York, this 20th day of November, A. D. 1918.

MARTIN ZAWISTOWSKI.